UNITED STATES PATENT OFFICE.

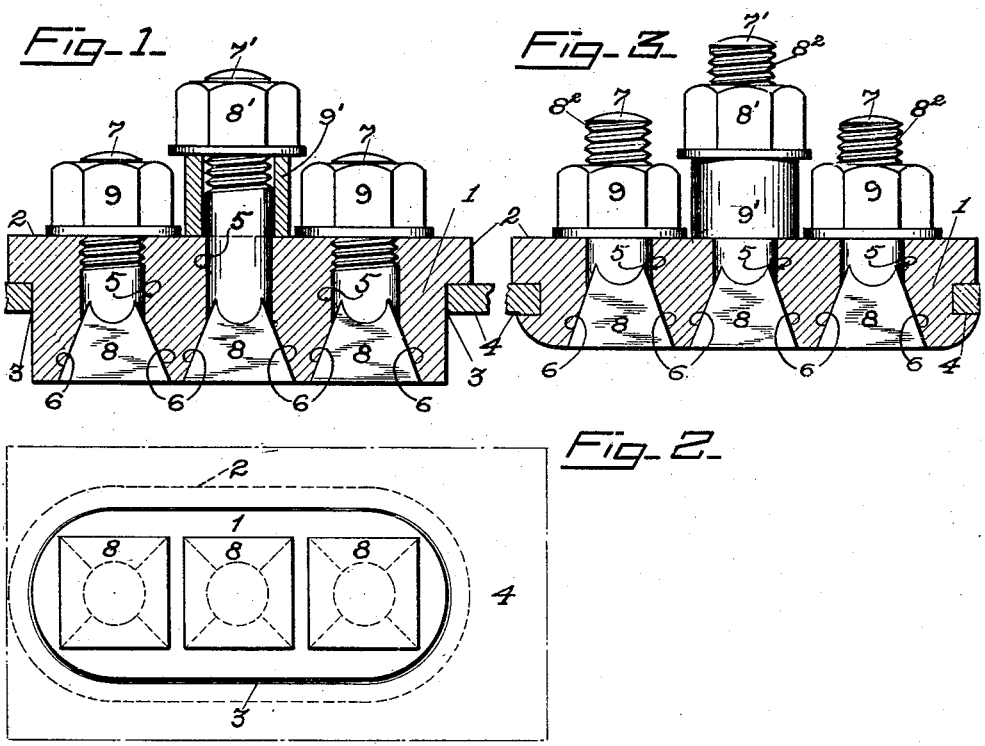

CHARLES G. HIGHTOWER, OF EUREKA, CALIFORNIA.

REPAIR PATCH OR PLUG FOR METALLIC STRUCTURES.

1,215,530.  Specification of Letters Patent.  Patented Feb. 13, 1917.

Application filed August 28, 1915.  Serial No. 47,730.

*To all whom it may concern:*

Be it known that I, CHARLES G. HIGHTOWER, a citizen of the United States, residing at Eureka, in the county of Humboldt and State of California, have invented certain new and useful Improvements in Repair Patches or Plugs for Metallic Structures, of which the following is a specification.

The hereinafter described invention relates to a repair patch or what may be properly termed an expansion plug for the closing of punctures, ruptures or breaks occurring in water boilers, pipe lines, condensers and similar structures subjected to internal pressures, and the object thereof is to provide a simple, effective and inexpensive plug for such purposes, one adapted for the closure of openings or apertures of varying shapes and sizes and which may be quickly and easily applied for the closure thereof, and applied to ruptured pipe lines without necessitating the closing down thereof or cutting off of the water supply.

In order to comprehend the invention, reference should be had to the accompanying sheet of drawings, wherein—

Figure 1 is a longitudinal sectional view of the plug illustrated positioned within an elongated cut out section of a ruptured pipe line.

Fig. 2 is a bottom plan view of the plug illustrated in Fig. 1 of the drawings.

Fig. 3 is a view similar to Fig. 1, illustrating the expansion plug in an upset or fixed position for closing the rupture of a pipe line.

In the drawings, referring more particularly to Figs. 1, 2 and 3 thereof, the numeral 1 is used to designate a sealing plug (preferably rectangular), formed of alloy metal, for instance, a composition of lead, zinc and antimony, or other soft metal. This plug is provided with an enlarged head 2, which embraces or overlaps the edge walls of the slot 3 formed in the wall 4 of a pipe or other structure, when the plug is inserted therein, Fig. 1 of the drawings, and the said head 2 is formed with a plurality of vertical bores 5, each of which terminates in an enlarged outwardly inclined seat 6. Through the bores 5 are fitted the expansion bolts 7, each of which terminates in an enlarged inwardly inclined head 8, which head fits within the enlarged or inclined seat portion 6 of the bores 5. The head 8 of the expansion bolts are formed square in cross section and rest normally within the square shaped seats 6 of the bores 5, and each expansion bolt at its outer end portion is screw-threaded as at 8, and on said screw-threaded portion of the expansion bolt works the securing nut 9. While in Figs. 1, 2 and 3 of the drawings, the expansion plug is provided with a plurality of expansion bolts, the central bolt 7' of the series is made slightly longer than the remaining bolts, and the securing nut 8' working on the screw-threaded end thereof is spaced or held a distance away from the outer face of the expansion plug 1 by means of the spacing block 9'. The purpose of this spacing block is to hold the securing nut 8' a distance beyond or above the securing nuts 9 of the remaining expansion bolts, this merely for convenience of the operator in applying to the said nut 8' a suitable tool for screwing the same onto or off of the thread extension 8 of the bolt 7'. Where this form of expansion plug is employed, that is; a plug of rectangular or irregular shape, provided with a plurality of expansion bolts, the same is utilized to close a split or longitudinal break in a pipe line and in order to insert the plug to close the same, it is only necessary to cut out a section of ruptured pipe of the pipe line, that is, to form a slotted section therein co-extensive with the split formed in the pipe, the opening thus made being of a size sufficient to enable the expansion plug 1 to be snugly fitted therein to project a slight distance within the interior of the pipe or wall 4, or until the flanged head 2 thereof rests securely on the outer surface of the said wall, as disclosed by Fig. 1 of the drawings. When the expansion plug is thus positioned, by means of any suitable tool applied to the securing nuts on the threaded end of the expansion bolts, the said nuts are tightened to draw outwardly the expansion bolts, with the result that the enlarged head of each bolt is drawn within the bore of the plug and pressure thus applied forces or expands the inwardly projecting end portions of the said expansion plug until the metal thereof has been upset or turned over to embrace the inner surface of the wall 4, as disclosed by Fig. 3 of the drawings. The upsetting of the metal of the expansion plug is due to the drawing of the enlarged head of the expansion bolt a distance within the bore 5 of the expansion plug 1, so that the pressure thus brought to bear onto the soft metal of the plug 1, forces the same to expand outwardly until the same overlies the edges of the inner surface of the wall 4 bounding the cut out section thereof.

The described invention is applicable for the closing of leaks or ruptures in hot water heaters, tanks, salt water, fresh water, steam and oil pipe lines of all descriptions, and equally so for closing the ruptures in condenser tubes, and the same serves to take the place of the clamps, bolts, nuts, rivets, and rubber gaskets ordinarily employed for such purpose, and the construction of the expansion plug is such that when positioned for closing a rupture, that the greater the pressure exerted on the inner surface thereof, the tighter the plug is held in its adjusted position. It is only required in applying the described plug for the closing of an opening or puncture in a wall to prevent leakage, that the hole or punctured section be reamed or cut away to provide an opening of suitable size for receiving a plug of standard size, the metal of which plug is then expanded so as to securely embrace the edge walls of the opening by screwing up the expansion bolt or bolts working therein for such purpose.

The described expansion plug for the closing of apertures and punctures or ruptures of the described character is effective, economical and easily applied, and in connection with pipe line systems the same may be applied and the rupture closed without causing a shutting down of the pipe line.

It will be understood that the described expansion plug is suitably constructed for all sizes of pipes, from one-half inch to twenty-four inch or over.

I am aware that various changes may be made in the details of construction of the working parts composing the described expansion plug without causing a departure from the invention, and therefore do not wish to be understood as confining or limiting the same to such details, but wish to be understood as claiming the invention as broadly as the state of the art will permit.

Having thus described the invention what is claimed as new and desired to be protected by Letters Patent is:—

In an expansion repair plug, the combination with an elongated headed plug member formed of soft expansible metal for insertion in an opening to be closed, said member provided with a plurality of alined bores extending therethrough, a plurality of expansion bolts within the bores in the plug member and each provided with a pyramid head connected at its apex to the respective bolt shank and arranged in said plug with certain edges of the faces of said heads in alinement with each other, and in a plane parallel with the sides of said headed plug member, and a nut coöperating with each expansion bolt to draw the headed end thereof into its coöperating bore to expand the metal of the plug member for the described purpose.

In testimony whereof I have signed my name to this specification in the presence of two subscribing witnesses.

CHARLES G. HIGHTOWER.

Witnesses:
W. B. McMILLAN,
A. C. CHARTERS.

Copies of this patent may be obtained for five cents each, by addressing the "Commissioner of Patents, Washington, D. C."